United States Patent

[11] 3,616,859

| [72] | Inventors | Edward G. Shay<br>Belle Mead;<br>Robert W. Bender, Jersey City, both of N.J. |
|---|---|---|
| [21] | Appl. No. | 789,370 |
| [22] | Filed | Jan. 6, 1969 |
| [45] | Patented | Nov. 2, 1971 |
| [73] | Assignee | Millmaster Onyx Corporation<br>New York, N.Y. |

[54] MAKING FOAM COMPOSITIONS FROM WATER-SOLUBLE SALTS OF UNDECYL SULFURIC ACID
5 Claims, No Drawings

[52] U.S. Cl. .................................................. 169/1 A,
252/3, 252/8.05, 252/307, 252/311
[51] Int. Cl. .................................................. A62c 1/12,
A62d 1/00
[50] Field of Search ........................................... 252/3, 4,
8.05, 307, 311, 351, 353

[56] References Cited
UNITED STATES PATENTS

| 2,114,042 | 4/1938 | Bertsch .................... | 252/3 |
|---|---|---|---|
| 2,135,365 | 11/1938 | Timpson .................... | 252/3 |
| 2,514,310 | 7/1950 | Busse et al. ................ | 252/3 |
| 2,529,211 | 11/1950 | Busse et al. ................ | 252/3 |
| 2,956,947 | 10/1960 | Carter et al. ................ | 252/8 |
| 3,394,768 | 7/1968 | Chocola et al. ............. | 252/3 |
| 3,479,285 | 11/1969 | Barthauer .................... | 252/3 |

Primary Examiner—John F. Goolkasian
Assistant Examiner—D. J. Fritsch
Attorney—Arthur A. Jacobs ABSTRACT: A foam-forming composition containing, as its principal active ingredient, a water-soluble salt of undecyl sulfuric acid, especially the ammonium or alkali-metal salt thereof.

MAKING FOAM COMPOSITIONS FROM WATER-SOLUBLE SALTS OF UNDECYL SULFURIC ACID

This invention relates to a foam-forming composition of matter which is capable of producing a stable aqueous foam of high bulk, and which will so perform over a wide range of temperature, and in the medium of either hard water, soft water or sea water.

It is known to the art to employ surface-active agents to generate aqueous foams to be used for various purposes. These agents range from soaps or salts of rosin or casein to alkylaryl sulfonates and alkyl sulfates, with more or less effectiveness. However, hard water adversely affects the foaming power of many of these agents, as does sea water. Extremes of temperature such as encountered during the passage of the various seasons of the year, or such as encountered in the course of fighting fires, also act to reduce the power of such agents to foam, or the stability of the foam when it is produced. Therefore, the effectiveness of such agents forth desired purpose is considerably impaired During industrial use or when used in building construction work, hard water, and often very hard water, is more likely to be available than soft water. Furthermore, plasters and cements which contain calcium sulfate in the form of gypsum or plaster of paris, which has a small but appreciable solubility, convert even soft water into hard water; this may be in addition to the bicarbonates of the alkali-earth metals or the magnesium sulfate or chloride occuring in many natural waters.

The term "hard water" is generally used to described water having an appreciable amount of carbonates, bicarbonates, sulfates and chlorides of calcium and magnesium, and sometimes also of iron. The term "hard water" also includes the possible presence of alkaline earths and heavy metal ions in general. By "appreciable amount" is meant at least about 75 p.p.m. to about 500 p.p.m. Very hard water is that which contains over 1,000 p.p.m.

It is therefore important to employ a foaming agent which is not deleteriously affected by the chemical or physical action of these and other salts.

The present composition, or the foam produced therefrom, may be incorporated into compositions containing gypsum or plaster of paris, as for the manufacture of wall board and the like; or compositions containing cement, as in concrete, and especially porous or light weight concrete, or other hydraulic cement, the term "concrete" being used in its generic sense as a conglomerate of gravel, broken stone, blast-furnace slag or cinders, termed the "aggregate," embedded in a matrix of either mortar or cement. It may also be used for production of a substantial, copious and relatively stable foam for the purpose of extinguishing fires.

The composition of this invention contains, as its principal active ingredient, the water-soluble salts of undecyl sulfuric acid, and especially the ammonium or the alkali-metal salts thereof. The said salts may be prepared by methods known to the art in the manufacture of their homologs on a large scale and for commercial purposes, such as in detergents, wetting agents, dispersing agents and the like, by sulfation with chlorosulfonic acid and other acids capable of converting an alcohol group into a sulfate group. The products of this invention are preferably so prepared from undecyl alcohol obtained by means of the oxo reaction on decene-1, which yields a mixture of n-undecanol and alpha-methyl decanol. These general methods are shown, for example, in Schwartz et al., "Surface Active Agents and Detergents," Vol. II, Interscience Publishers, Inc., New York, N.Y., 1958, on pages 59–61.

With respect to temperature, concrete may be laid at any time of year and at any condition of temperature short of freezing, even under the direct rays of the summer sun. As will be demonstrated hereinafter, the foam produced by salts of the undecyl sulfuric acid of this invention is barely affected by differences of temperature, in the range of at least from about 60° F. to 120° F.

The method of producing the desired foam with the products of this invention depends on the particular practical application. In all cases, it is produced by agitation, either chemical or mechanical. In fire extinguishers, for example, the foam is most often produced by the gas that propels it. This gas may be the result of chemical action; for example, by the reaction of acid on sodium bicarbonate in aqueous medium; or mechanically from a source of compressed gas, such as carbon dioxide or the like.

The foam may also be produced and propelled by mechanical means. For example, in the fabrication of concrete or plaster slabs or boards or other structural artifacts, it may be injected as a spray or produced by atomixing air, or it may entrained in air introduced by mechanical action such as by agitating, tumbling, whipping or other means. Any of these methods may be employed to create the foam which may than be added to the magma. Alternatively the foam may be produced in situ in the water of the mix.

In any event, a firm and voluminous foam will be obtained, and it will so remain for a period of time adequate for the intended application.

For the purpose of evaluation in the laboratory, the foams were produced by mechanical action. One means for evaluating surface-active agents is the commonly used Ross-Miles apparatus (vide "Oil and Soap," May 1941, pp. 99–102) in which a stream of a measured volume of solution falls from a height into a pool of the same, thus whipping up a foam which can be measured.

Another method employs a household type, high speed and automatically timed Waring blender. This was used in certain of the following examples. The glass vessel was calibrated at the 50 ml. and 100 ml. levels. One hundred ml. of the solution to be tested was introduced into the vessel and the agitator was run for 30 seconds at the highest speed; at the end of that period the height of the foam obtained was measured immediately with a millimeter rule.

In some cases the foam height was also measured first at 30 seconds and than at 60 seconds afterwards.

The "half-life" of the foam was determined by means of a stop-watch, in terms of the number of seconds elapsing from the moment the agitator stopped until the liquid level returned to the 50 ml. mark.

The tests, unless otherwise indicated, were run at ambient temperature. Other temperature levels were obtained by preheating the sample.

The hard water used in the following tests was prepared according to the formula to be found in Section 5.027of the "Official Methods of the Association of Official Analytical Chemists," 10th Edition (1965).

The synthetic sea water employed contained, per liter: 24.3 g. of NaCl; 3.9 g. of $MgSO_4 \cdot 7H_2O$; 2.96 g. of $MgCL_2$; 1.6 g. of $CaSO_4 \cdot 2H_2O$; 0.6 g. of KBr; 0.07 g. of KCL; and 0.7 g. of KI, in distilled water.

For comparison, other surface-active agents included Maprofix WAQ, a commercially available sodium lauryl sulfate, abut 30 percent active; Ultrawet 60K., a sodium linear alkylate sulfonate, about 60 percent active; sodium decyl sulfate, sodium tridecyl sulfate; sodium "lauryl" sulfate, a mixture of $C_{12}$, $C_{14}$ and $C_{16}$ homologs, all about 30 percent active; or their corresponding ammonium slats. All were diluted at the time of testing with water of the appropriate degree of hardness. Where "tap water" is disclosed, it is the water supply of Jersey City, N.J., with a hardness of about 50 p.p.m.

The following are merely illustrative of the performance of the undecyl sulfate salts, and are not intended to be limiting.

EXAMPLE 1

Solutions of the ammonium salts of undecyl sulfuric acid and "lauryl" sulfuric acid were diluted to 0.3 percent by weight in synthetic hard water at 800 p.p.m. hardness, heated or cooled to the indicated temperatures, and tested by the Waring blender method, as follows:

Table I

Foam Height, in mm.

| Alkyl sulfate | 120° F. | 100° F. | 80° F. | 60° F. |
| --- | --- | --- | --- | --- |
| Undecyl | 61 | 62½ | 59 | 60½ |
| "Lauryl" | 72 | 59½ | 41 | 37½ |

It is apparent that over the above temperature range the amount of foam generated by the ammonium undecyl sulfate is surprisingly uniform, whereas the ammonium "lauryl" sulfate falls off sharply at the lower temperatures.

The corresponding sodium and potassium salts gave similar results.

EXAMPLE 2

In a similar test, but at 1,000 p.p.m. water hardness and at room temperature, the ammonium salts of undecyl, "lauryl" and tridecyl sulfuric acid were agitated as before, the resulting foam was measured at once, and the "half-life" was determined. The activity in each case was 0.06 percent.

Table II

| Alkyl Sulfate | Foam Height, mm. | Half-Life, Seconds |
| --- | --- | --- |
| Undecyl | 61.5 | 58.4 |
| "Lauryl" | 35 | 0 |
| Tridecyl | 45 | 28.4 |

The corresponding sodium and potassium salts gave similar results.

EXAMPLE 3

The ammonium salts of decyl, undecyl and "lauryl" sulfuric acid were diluted to 0.6 percent active in water of graduated degrees of hardness. They were tested in the Ross-Miles apparatus at 60° F. the water jacket being maintained at the same temperature. The height of foam generated is the average, over a period of 5 minutes, in mm.

Table III

| Alkyl Sulfate | Tap Water | 300 p.p.m. | 500 p.p.m. | 1,000 p.p.m. |
| --- | --- | --- | --- | --- |
| Decyl | 160 | 155 | 148 | 156 |
| Undecyl | 197 | 198½ | 196 | 198 |
| "Lauryl" | 188 | 190 | 187½ | 153 |

EXAMPLE 3

Synthetic sea water at room temperature was employed as a diluent for sodium undecyl, lauryl and tridecyl sulfates at the concentrations indicated. The Waring blender test was used.

Table IV

Sea Water; Height of Foam, mm.; Half-Life, Seconds

| Alkyl Sulfate | 0.12% | 0.18 % | 0.30% |
| --- | --- | --- | --- |
| Undecyl | 68 mm. | 60 mm. | 104 mm. |
| | 36.4 sec. | 51.9 sec. | 91 sec. |
| Lauryl | 47 mm. | 50 mm. | 50 mm. |
| | 26.2 sec. | 28.8 sec. | 38.7 sec. |
| Tridecyl | 56 mm. | 57 mm. | 72 mm. |
| | 30.2 sec. | 36.7 sec. | 46.3 sec. |

Example 5

Sodium and ammonium undecyl sulfates, sodium "lauryl" sulfate and Ultrawet 60 K. were adjusted by dilution to about 30 percent active content, along with 2 percent by weight of ammonium chloride. Dilutions of each of these were prepared at 0.09 percent in hard water at 1,000 p.p.m. hardness. They were agitated, at room temperature, in the Waring blender for 30 seconds, and the height of the foam was measured at once, and also after 30 seconds and 60 seconds.

Table V 1,000 p.p.m. Hard Water; Foam Height, mm.

| Agent | Initial, mm. | 30 Seconds, mm. | 60 Seconds, mm. |
| --- | --- | --- | --- |
| "Lauryl" | 77 | 92 | 63 |
| Na, Undecyl | 96 | 92 | 89.5 |
| NH₄, Undecyl | 95 | 91 | 86 |
| Ultrawet | 65 | 40 | 36.5 |

EXAMPLE 6

A cellular concrete slab was prepared incorporating sodium undecyl sulfate at 0.075 percent as described in U.S. Pat. No. 2,215,812. The resultant casting had a density of 70.5 pounds cubic feet.

EXAMPLE 7

A gypsum foam was prepared incorporating sodium undecyl sulfate at 0.25 percent based on the water used as described in U.S. Pat. No. 2,913,346. The finished plaster body was porous lightweight, suitable, for example, for use as in insulating medium.

EXAMPLE 8

A fire extinguishment test was run approximately as described in column 3, lines 37–47, U.S. No. 2,956,957. Results are summarized in table VI.

Table VI

| Agent | Conc. | Extinguishment Time, Seconds | |
| --- | --- | --- | --- |
| | | Tap Water | Syn. Sea Water |
| Sodium Undecyl Sulfate | 0.5% | 73 | 67 |
| Sodium Undecyl Sulfate | 0.25% | 89 | 81 |
| Sodium Lauryl Sulfate | 0.05% | 102 | >120 |
| Sodium Lauryl Sulfate | 0.25% | >120 | >120 |
| Sodium Tridecyl Sulfate | 0.5% | 97 | 94 |
| Sodium Tridecyl Sulfate | 0.25% | >120 | 112 |

These These tests indicate the effectiveness of sodium undecyl sulfate in this application.

We claim:

1. A method of generating an aqueous foam which comprises admixing a water-soluble salt of undecyl sulfuric acid by itself with water and then agitating the mixture.

2. The method of claim 5 wherein the salt of the undecyl sulfuric acid is a member of the group consisting of the ammonium and alkali-metal salts.

3. The method of claim 5 wherein the agitation is produced by mechanical agitation.

4. The method of claim 5 wherein the agitation is produced by the intermixture of a gas under pressure.

5. A method of extinguishing fires which comprises spraying the fires with a composition made by the method of claim 5.

* * * * *

UNITED STATES PATENT OFFICE
CERTIFICATE OF CORRECTION

Patent No. 3,616,859　　　　　　　　　Dated November 2, 1971

Inventor(s) Edward G. Shay and Robert W. Bender

It is certified that error appears in the above-identified patent and that said Letters Patent are hereby corrected as shown below:

Claims 2, 3, 4 and 5, line 1 of each claim, "claim 5" is changed to read    ---claim 1---

Signed and sealed this 14th day of March 1972.

(SEAL)
Attest:

EDWARD M. FLETCHER, JR.　　　　　ROBERT GOTTSCHALK
Attesting Officer　　　　　　　　Commissioner of Patents